Figure 1:
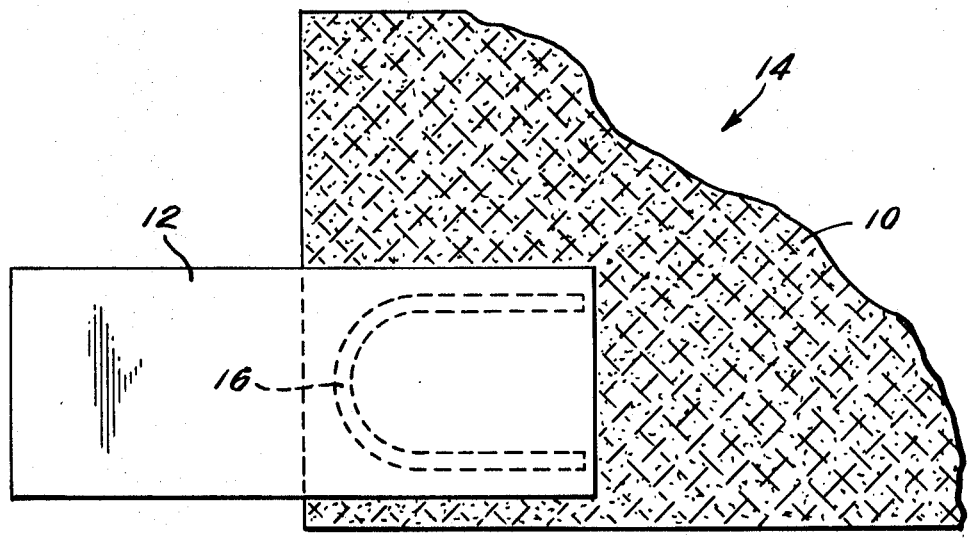

United States Patent

[11] 3,607,432

| | | |
|---|---|---|
| [72] | Inventor | Keith N. Johnson<br>Cumberland, R.I. |
| [21] | Appl. No. | 683,494 |
| [22] | Filed | Nov. 16, 1967 |
| [45] | Patented | Sept. 21, 1971 |
| [73] | Assignee | Texas Instruments Incorporated<br>Dallas, Tex. |

[54] BATTERY ELECTRODE HAVING A LEAD ATTACHED THERETO AND METHOD OF MAKING SAME
13 Claims, 2 Drawing Figs.

[52] U.S. Cl............................................... 136/120 R,
136/24, 136/28, 136/75, 219/94
[51] Int. Cl............................................... H01m 13/00
[50] Field of Search........................................ 136/75, 76,
28, 29, 24, 120, 6, 83; 219/94

[56] References Cited
UNITED STATES PATENTS

| 1,329,413 | 2/1920 | Kicklighter.................. | 219/94 |
| 1,367,553 | 2/1921 | Kicklighter.................. | 219/94 |
| 1,493,043 | 5/1924 | Lachman et al. ............. | 219/94 |
| 2,861,115 | 11/1958 | Berg............................. | 136/28 |
| 3,026,365 | 3/1962 | Hughes et al. ................ | 136/120 |
| 3,050,576 | 8/1962 | Comanor...................... | 136/28 |
| 3,214,564 | 10/1965 | Katzer et al................... | 219/117 |
| 3,245,837 | 4/1966 | Ikeda et al. ................... | 136/28 |

*Primary Examiner*—Winston A. Douglas
*Assistant Examiner*—C. F. Lefevour
*Attorneys*—Harold Levine, Edward J. Connors, Jr., John A. Haug and James P. McAndrews ABSTRACT: A porous battery plate comprising nickel metal powder sintered to nickel metal mesh and having an electrochemically active material such as cadmium hydroxide impregnated therein is shown to be secured to a nickel lead member for use in electrically connecting the plate as an electrode in an alkaline electrolyte battery or the like by inserting a nickel-plated nickel wire between portions of the lead member and plate and by welding the lead member to the plate by electrical resistance welding, the nickel wire plating embodying a phosphor constituent or the like such as is inherently deposited therein during formation of the plating by electroless nickel-plating techniques for lowering the melting temperature of the nickel plating below the melting temperature of the nickel lead member, the plated nickel wire serving as a weld projection for securing the lead member to the plate.

PATENTED SEP21 1971  3,607,432

INVENTOR,
Keith N. Johnson,
BY
James P McAndrew Att'y.

BATTERY ELECTRODE HAVING A LEAD ATTACHED THERETO AND METHOD OF MAKING SAME

Battery electrodes for use in nickel-cadmium batteries and the like having alkaline electrolytes are conventionally made by sintering nickel metal powder to nickel mesh to form plaque structures having approximately 80 percent of their total volume devoted to very small pores. These sintered plaque structures are then impregnated with electrochemically active materials such as cadmium hydroxide and nickelic hydroxide to form a battery plate. In the sintering and impregnating process steps conventionally used for forming the battery plates, it is convenient and economically advantageous to form relatively large plate structures which are subsequently cut into much smaller pieces for use as individual electrodes in battery cells. However, before the small pieces of the battery plate can be used as battery electrodes, an electrode lead must be securely attached in good electrical contact with each piece of the battery plate material. Considerable difficulty has been experienced in attaching such leads to the porous battery plate after the plate has been impregnated with the desired electrochemically active materials.

It is an object of this invention to provide a novel and improved method for attaching lead members to battery plates to form battery electrodes; to provide such a method for use in attaching a lead member to a porous battery plate having electrochemically active materials impregnated therein; to provide such a method which securely attached the lead member to the battery plate to assure good electrical contact between the lead member and the plate; and to provide such a method which is easily and economically preformed. It is also an object of this invention to provide a novel and improved battery electrode having a lead member securely attached in good electrical contact to the battery electrode plate structure.

Figure 2:
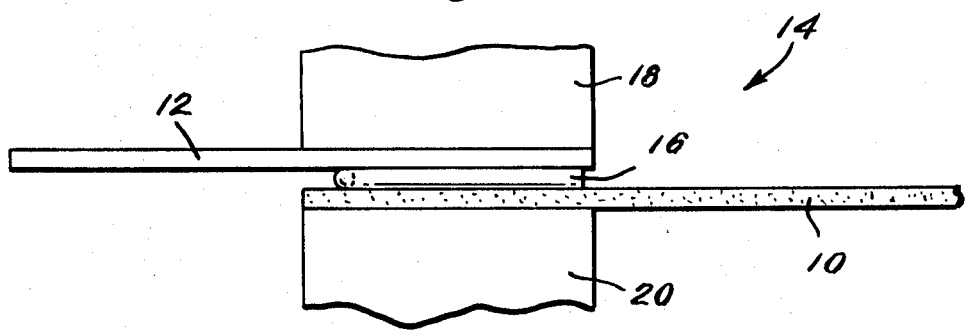

Other objects, advantages and details of the method and electrode materials provided by this invention appear in the following detailed description of a preferred embodiment of the invention, the detailed description referring to the drawings in which:

FIG. 1 is a partial plan view of a battery electrode provided by this invention; and FIG. 2 is a partial side elevation view of the electrode of FIG. 1 illustrating steps of the method provided by this invention for making such an electrode.

A battery electrode plaque is conventionally formed by depositing nickel metal powder such as carbonyl nickel powder on a nickel metal mesh and by sintering the mesh and powder for securing the powder particles to each other and to the mesh to form a porous plaque structure. Such plaque structures usually have approximately 80 percent of their total volume devoted to pores of very small size. In the conventional process for forming a battery plate from such plaque structures, the plaque structure is immersed in a concentrated solution of cadmium or nickel salt to impregnate the plaque pores with the solution. The impregnated plaque is then immersed in a sodium or potassium hydroxide solution for precipitating cadmium hydroxide or nickel hydroxide within the plaque pores. The plaque having the described precipitate therein is then subjected to a forming step in which the hydroxide precipitate is fully converted to electrochemically active cadmium or nickel materials to form a battery plate. The battery plate is then washed, and scrubbed if required, and is cut into pieces of selected size for use in forming individual battery electrodes. As battery plates formed in this manner are completely conventional, they are not further described herein and it will be understood that the plates comprise nickel metal powders sintered to a metal mesh such as nickel, steel or the like and impregnated with electrochemically active cadmium or nickel material to form a porous structure.

Referring to FIGS. 1 and 2 of the drawings, a battery plate 10 prepared and cut in the manner above described is combined with a lead member 12 to form a battery electrode 14. For most purposes, such as use of the electrode in sealed, rechargeable nickel-cadmium batteries and the like of C or D size, the battery plate 10 has a thickness of about 0.025 inch and the lead member 12 has a thickness of about 0.015 inch, the lead member being about 0.250 inch wide and having a length of about 0.750 inch superimposed over a portion of the battery plate 10. The lead member is preferably formed of nickel metal which displays good electrical conductivity and which is relatively inert when immersed in alkaline electrolytes.

In accordance with this invention, the lead member 12 is attached to the battery plate 10 by use of a coated metal wire 16 which is preferably formed into U-shape and inserted between the lead member and battery plate as illustrated in FIG. 1. The lead member and plate are then gripped between the electrodes 18 and 20 of any conventional resistance welding apparatus, and electrical current is directed through the lead member, wire and plate between the electrodes 18 and 20 for welding the lead member to the plate. In this arrangement, the wire 16 serves as weld projection means for facilitating welding of the lead member to the plate and provides sufficient area to secure attachment between the lead member and plate to assure that the lead member is in good electrical contact with the plate.

In this regard, it is an important part of this invention that the coated metal wire embody a coating which has a melting temperature similar to but slightly lower than the melting temperature of the metal embodied in the lead member 10. For example, where the lead member has the proportions suggested above and embodies substantially pure nickel material having a melting temperature on the order of 1400° C., the coated metal wire 16 preferably embodies a nickel metal wire core of the same melting temperature and embodies a coating formed thereon by conventional electroless nickel plating. The wire core preferably has a diameter of from about 0.010 inch to 0.028 inch and the coating has a thickness of about 0.003 inch. When this coating is formed by electroless plating techniques, it is found that, as a result of the process used, the wire coating embodies a phosphor constituent which provides the coating with a melting temperature approximately 200° C. lower than the melting temperature of the nickel metal embodied in the lead member 12. When this coated wire is used for attaching the lead member to a battery plate embodying nickel plaque materials having a melting temperature similar to that of the lead member material, and when the materials are subjected to resistance-welding temperatures on the order of 1400–1450° C. the lead member is securely attached to the battery plate in good electrical contact therewith. In fact, it has been found that when the lead member is pulled from the battery plate, the plate material separates before the weld established between the lead member and the plate is broken. Further, because the lead and plate components have a higher melting temperature than the wire coating, the weld can be completed at a sufficiently low thickness to avoid any significant sticking between the lead and plate and the electrodes used in forming the weld.

It should be understood that although the coated wire 16 has been described as comprising a nickel metal core having an electroless nickel-plated coating thereon, the coated wire could also be formed in other ways within the scope of this invention provided that the wire coating has a melting temperature similar to but slightly lower than the melting temperature of the lead material. The wire could also comprise a solid metal wire of melting temperature similar to but slightly lower than the melting temperature of the lead material.

Although particular embodiments of the electrode and method of this invention have been described by way of illustration, it should be understood that this invention includes all modifications and equivalents thereof falling within the scope of the appended claims.

I claim:

1. A method for forming a battery electrode comprising the steps of arranging a length of wire in a plane between a flat metal electrode lead strip and a porous battery plate so that a substantial portion of the wire periphery is in contact with the lead and plate, said wire having at least a surface layer of metal material which has a similar but slightly lower melting temperature than the metal embodied in said lead strip, and directing electrical current through the lead, wire and plate for resistance welding the wire to the lead strip and plate to form a battery electrode.

2. The method as set forth in claim 1 wherein said battery plate comprises a porous, sintered nickel plaque having electrochemically active material impregnated therein.

3. The method as set forth in claim 1 wherein said electrode lead comprises a flat strip of nickel metal material.

4. The method as set forth in claim 1 wherein said wire embodies a nickel material having a melting temperature lower than said electrode lead material.

5. The method as set forth in claim 1 wherein said wire embodies a nickel metal core coated with nickel metal material having a melting temperature lower than said electrode lead material.

6. A method for forming a cadmium battery electrode comprising the steps of electroless nickel plating a nickel wire to form a wire coating of a nickel metal material having a phosphor constituent therein, arranging said wire in U-shape in a plane between a portion of a nickel metal strip and a portion of a battery plate so that substantial portion of the wire periphery is in contact with said strip and plate, said plate embodying a porous, sintered nickel plaque having electrochemically active cadmium material impregnated therein, and directing electrical current through the strip, wire and plate for resistance welding the wire to the strip and plate to form a battery electrode.

7. A method for forming a nickel battery electrode comprising the steps of electroless nickel plating a nickel wire to form a wire coating of a nickel metal material having a phosphor constituent therein, arranging said wire in U-shape between a portion of a nickel material strip and a portion of a battery plate so that a substantial portion of the wire periphery is in contact with said strip and plate, said plate embodying a porous, sintered nickel plaque having electrochemically active nickel material impregnated therein, and directing electrical current through the strip, wire and plate for resistance welding the wire to the strip and plate to form a battery electrode.

8. A battery electrode comprising a porous battery plate, a flat metal strip lead member, and a length of wire disposed in a plane between said lead and plate having a substantial portion of said wire in contact with said lead and plate, said wire having at least a surface layer of metal material which has a similar but slightly lower melting temperature than the melting temperature of the metal embodied in the lead member, said wire being welded to said lead and plate.

9. A battery electrode as set forth in claim 8 wherein said battery plate comprises a porous, sintered nickel plaque having electrochemically active material impregnated therein.

10. A battery electrode as set forth in claim 8 wherein said lead comprises a flat strip of nickel metal material.

11. A battery electrode as set forth in claim 8 wherein said wire comprises a nickel metal core coated with a nickel metal material having a melting temperature lower than said lead material.

12. A cadmium battery electrode comprising a porous sintered nickel plaque having electrochemically active cadmium material impregnated therein, a flat strip of nickel metal material having a portion superimposed on a portion of said plate, and a wire embodying a nickel metal core having an electroless nickel plated coating thereon, said wire being formed in U-shape and disposed in a plane between said superimposed strip and plate portions in contact with said strip and plate portions, said wire being welded to said strip and plate.

13. A nickel battery electrode comprising a porous sintered nickel plaque having electrochemically active nickel material impregnated therein, a flat strip of nickel metal material having a portion superimposed on a portion of said plate, and a wire embodying a nickel metal core having an electroless nickel plated coating thereon, said wire being formed in U-shape and disposed in a plane between said superimposed strip and plate portions in contact with said strip and plate portions, said wire being welded to said strip and plate.